UNITED STATES PATENT OFFICE.

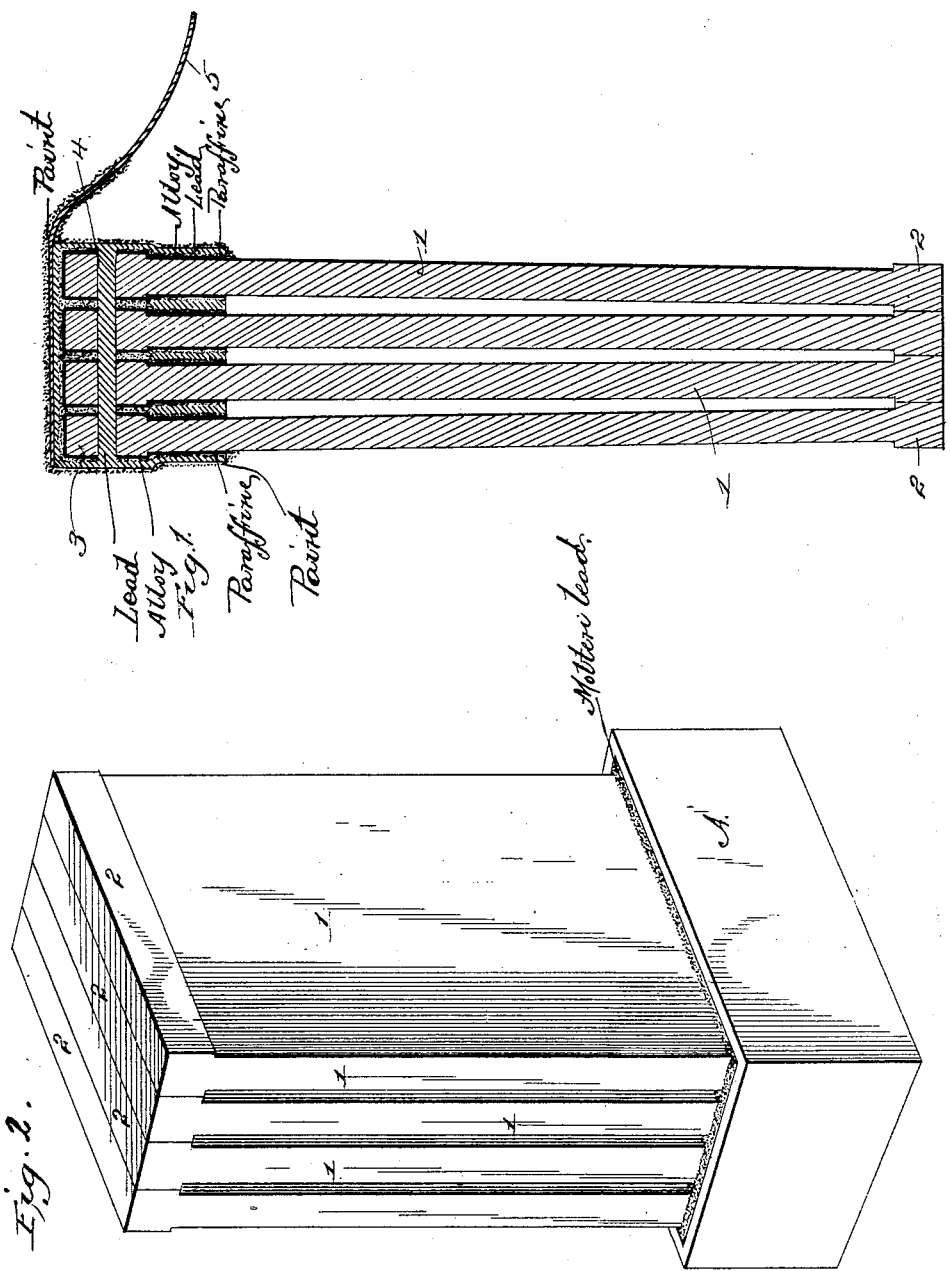

FRANK G. CURTIS, OF PHILADELPHIA, PENNSYLVANIA, ASSIGNOR TO J. BOARDMAN CANN, OF BOSTON, AND FREDERICK D. GOODE, OF NEWTON, MASSACHUSETTS.

POLE-PIECE FOR ELECTRICAL BATTERIES.

SPECIFICATION forming part of Letters Patent No. 561,205, dated June 2, 1896.

Application filed February 20, 1893. Renewed November 14, 1895. Serial No. 568,979. (No model.)

*To all whom it may concern:*

Be it known that I, FRANK G. CURTIS, a citizen of the United States, residing at Philadelphia, in the county of Philadelphia and State of Pennsylvania, have invented certain new and useful Improvements in Pole-Pieces for Electrical Batteries; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to provide a new and improved construction in carbon plates of primary batteries, and it relates to a construction whereby a maximum of active surface of a plate or pole-piece may be obtained with a minimum weight of carbon and to a construction whereby an efficient and perfect electrical connection is obtained between the several separate plates of which each pole-piece is composed and between the said pole-piece and the plates of another cell or with the line conductor; and for these purposes it consists in the construction, arrangement, and position of the several parts of which it is composed, as will be hereinafter more fully described and claimed.

Referring to the accompanying drawings, in which corresponding parts are designated by similar marks of reference, Figure 1 is a transverse vertical section of a pole-piece constructed of several plates according to my invention. Fig. 2 is a perspective view of a pole-piece inverted and placed in a bath of molten lead.

Each of the plates 1 has an enlargement or shoulder 2 formed on each of its sides at its base, while similar enlargements or shoulders 3 are formed at the top of the plate. If several plates so constructed are assembled together side by side to form a single carbon pole-piece, as is shown in Fig. 1, it will be seen that the corresponding shoulders 2 and 3 on contiguous plates will bear upon each other and hold the bodies of the plates at a sufficient distance apart to permit the entrance of the exciting material between them, and it is thus evident that the carbon pole made as above described will offer a large surface to the action of the exciting material in proportion to its mass and the space occupied by it.

In order to accomplish the second object of my invention—viz., to bind the several plates 1 firmly together and to form an efficient means for connecting the said plates with a conductor, which means will be protected from and unaffected by the exciting material, which in the use of the present form of pressure-connectors are often oxidized by the entrance of the exciter between the top of the plate and the binder to such an extent as to render the resistance of the connection excessively great—I construct the completed pole-pieces as follows:

A suitable hole 4 is formed in each of the plates 1, hereinbefore described, the said holes passing through the upper shoulders 3 on the plates, the position of the holes 4 in the plates 1 being such that when the plates are placed side by side the holes therein will be in alinement. Several plates thus constructed are then dipped in melted paraffin, so that when the plates are withdrawn therefrom and permitted to cool the cavities in the carbon for about an inch of the upper ends thereof will be filled with paraffin-wax, which thus prevents the liquids of the battery from rising within the carbon to the upper end thereof, where they would act upon the connector. After the removal of the plate from the paraffin-bath (the paraffin being at a high temperature and the carbon being withdrawn as soon as the pores in the interior thereof are filled therewith, the wax upon the surface of the plates, if there be any, being scraped off, leaving an uncovered carbon surface) I place the paraffined ends of the plates in an electrolytical bath, the solution in which is such that the deposit formed upon the end of the plates will consist of an alloy of copper and tin in the proportion of sixty parts of copper to forty parts of tin, I having found that this composition prevents the corrosion of the copper by the exciting liquid. As many plates are then taken as may be desired to form into a single pole-piece, their plated ends having been washed in a solution of chlorid of tin and chlorid of zinc, and are placed side by side and inverted in a bath (see A, Fig. 2) of molten lead to a height sufficient to entirely cover the alloy. This lead, when solidified around the pole-piece, not only covers the alloy, but also fills the holes 4 in the plates with a solid rod of lead running through all the plates and holding them firmly together, the lead at the same time uniting with the alloy deposited on the plates and forming a highly-conducting connection between the plates. A strip 5 of some highly-conducting medium, such as copper, and of a suitable length, breadth, and thickness, is then soldered to the lead across the top of the carbons, the projecting end of the strip 5 extending a sufficient distance to be connected to a pole of the adjoining cell or to be connected with any desired conductor by means of a suitable clamp. The pole-piece thus prepared has then its upper end painted with any desired acid-proof paint, the paint also extending a sufficient distance along strip 5 to protect it against the action of any exciting liquor that might be thrown thereon.

It will be observed that while I have shown and described this part of my invention in connection with a plurality of plates formed as hereinbefore described plates of other construction may be used if desired, and that a single plate may be coated with paraffin, copper, tin, &c., in order to form an efficient connection therewith when it is desired to use such a single plate by itself as the carbon pole, and that a pole constructed as above described may be used in any battery in which a carbon pole of the usual construction is now employed.

I have found that in a pole constructed according to this invention a perfect contact is secured between the carbon and the plating, between the plating and the lead, and between the lead and the strip 5, the contact being much more perfect than a mechanical one and than a contact between lead and carbon, while the contacts are protected from the action of the exciting fluid.

Having thus described my invention, what I claim, and desire to secure by Letters Patent, is—

1. The hereinbefore-described article of manufacture, consisting of a carbon plate having electrically deposited thereon an alloy of copper and tin in the proportions specified, substantially as described.

2. The hereinbefore-described article of manufacture, consisting of a carbon plate having its end saturated with paraffin and covered with an electrically-deposited alloy of copper and tin, substantially as described.

3. The hereinbefore-described article of manufacture, consisting of a carbon plate having an alloy of copper and tin on one portion thereof, substantially as described.

4. The hereinbefore-described article of manufacture, consisting of a carbon plate having an alloy of copper and tin on one portion thereof, and having a metal more fusible than the said alloy covering it, substantially as described.

5. The hereinbefore-described article of manufacture, consisting of a plurality of carbon plates, each of the said plates having one of its ends covered with a layer of an electrically-deposited alloy of copper and tin, the several plates being connected together by having a metal more fusible than said alloy surrounding their covered ends, substantially as described.

6. The hereinbefore-described article of manufacture, consisting of a plurality of carbon plates, each of the said plates having one of its ends saturated with paraffin and covered with a layer of an alloy of copper and tin, in the proportions specified, the said plates being bound together by having a metal more fusible than the said alloy surrounding their covered ends, a conductor soldered to the said cast metal and a layer of acid-resisting paint over the said metal and a part of the conducting-strip, substantially as described.

In testimony whereof I affix my signature in presence of two witnesses.

FRANK G. CURTIS.

Witnesses:
C. MATHER,
CHARLES RICHARDSON.